UNITED STATES PATENT OFFICE.

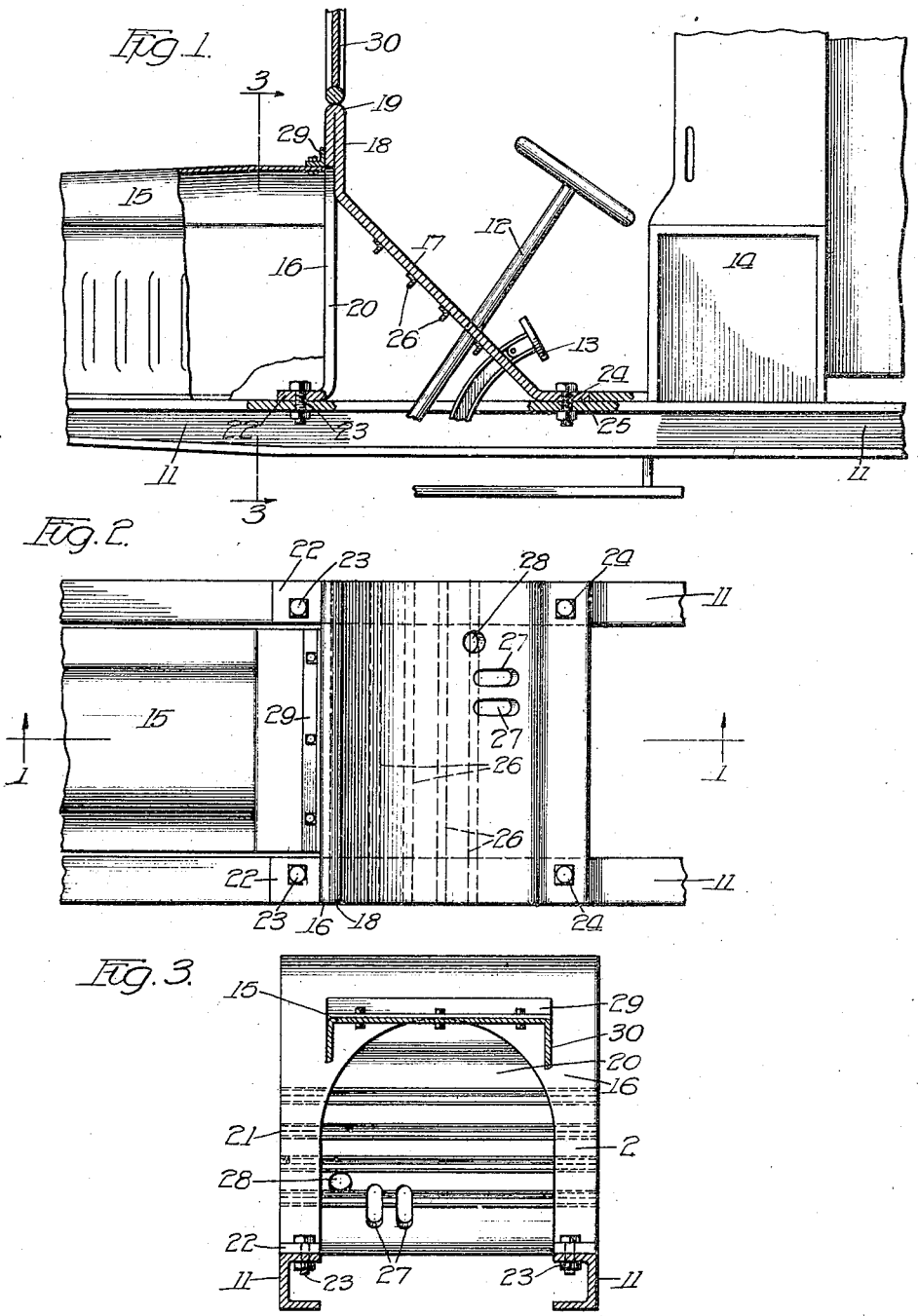

HARRY G. MOORE, OF CORLISS, WISCONSIN, ASSIGNOR TO CORLISS MOTOR TRUCK COMPANY, OF CORLISS, WISCONSIN, A CORPORATION OF WISCONSIN.

COMBINED DASH AND TOE BOARD FOR AUTOMOBILES.

1,243,962. Specification of Letters Patent. Patented Oct. 23, 1917.

Application filed October 6, 1916. Serial No. 124,032.

*To all whom it may concern:*

Be it known that I, HARRY G. MOORE, a citizen of the United States, residing at Corliss, in the county of Racine, in the State of Wisconsin, have invented certain new and useful Improvements in Combined Dash and Toe Boards for Automobiles, of which the following is a specification.

My invention relates to combined dash and toe boards for automobiles, and has for its objects to produce a device of the class above mentioned, made of a single piece of sheet metal; to produce a device that can be easily and quickly attached and detached; to provide a device that permits the shortening of the space between the driver's seat and the engine; to provide a device that will strengthen the frame of the automobile; to provide a device that permits the ready accessibility to the interior of the car; to provide a device that is an attachment and not normally a part of the automobile; to provide a device that is very simple and very strong; to provide a device that has a minimum of parts and is especially economical to manufacture, and in general to provide an improved device of the character referred to.

On the accompanying drawings, Figure 1 is a sectional side elevation of the device attached to an ordinary commercial vehicle.

Fig. 2 is a plan view.

Fig. 3 is a front view of the device looking from the engine toward the driver's seat.

In the drawings are shown some of the parts of an automobile that are not part of the comprising invention, but will necessarily have to be referred to.

In the drawings 11 designates the ordinary channels comprising the automobile frame, 12 the steering post, 13 the foot pedals, 14 the driver's seat, and 15 the engine hood.

The device itself comprises a single sheet of metal having an upright dash board portion 16, and an inclined toe board portion 17, the continuation of the toe board portion is a small upright portion 18 which is sometimes called the instrument board and is designed to support such devices as a speedometer, clock, etc.; the parts 16 and 18 are joined by a bend 19 at their upper ends and are preferably formed to rest in contact with each other, the dash board 16 is provided with an opening 20, between leg portions 21. The lower ends of the legs 21 are bent to provide offsets 22, which are secured to the channels 11 of the frame of the automobile by means of bolts and nuts 23, the toe board part 17 has a portion 25 bent at an angle to itself.

Applied to the underside of the toe board 17, are a plurality of reinforcing angle irons or bars 26, secured by spot-welding or in some other approved manner. The toe board 17 is also provided with apertures 27 for the foot pedals 13, and aperture 28 for the steering wheel post 12. The dash board 17 is also provided with an angle iron 29 for supporting the hood 15. This angle iron may be secured as are the stiffening members 26 by spot-welding.

It will be evident from the foregoing description that the device which is formed out of a sheet metal blank can be very economically made. All that there is necessary to do is to make the appropriate bends and cut the necessary holes for the foot pedals and steering wheel post. By the arrangement shown the openings in either side of the device between the dash board and toe board at the side of the automobile permit the inspection of the mechanisms that lie adjacent thereto. These openings may be normally closed by appropriate curtains. It will also be evident that when it is desired to further inspect the interior of the automobile, all that is to be done is to remove the four bolts and nuts, and then the entire combined dash and toe board may be bodily lifted off the frame. This leaves the entire forward end of the interior of the automobile exposed for inspection or repairs.

By the arrangement shown the dash board may be placed farther forward on the frame so that considerable space is thereby saved. This is particularly valuable in commercial vehicle construction. This is made possible by the opening cut in the dash board which permits this board to be set up very close to the engine, or partly over it if so desired.

It will be obvious from the above description that the various objects enumerated are accomplished in the desired manner. It will also be obvious that the details of construction may be modified without departing from the invention set forth in the appended claims. I do not therefore wish to be understood as being limited to the details of form and construction as shown.

I claim:

1. As a new article of manufacture, a single piece of sheet metal suitably bent to form a dash board and a toe board including means for detachably securing said device to the autotmobile frame.

2. In an improved dash board and toe board, formed of a suitably bent piece of sheet metal, a dash board having legs adapted to be detachably secured to the frame of an automobile, and a toe board having reinforcing bars, said toe board being a continuation of said dash board.

3. In a combined dash and toe board for automobiles, an upright dash portion furnishing means for securing the automobile hood thereto, an inclined toe board portion, said toe board portion being integral with said dash portion, and means for detachably securing said combined dash and toe board to the automobile.

4. As a new article of manufacture, a dash board, means associated therewith for supporting the hood of an automobile, means for detachably securing said dash board to the automobile, and an inclined toe board integral with said dash board to furnish an instrument board, said toe board adapted to be detachably secured to the automobile and serving as a stiffening member for the automobile frame.

5. In a device of the class described, dash and toe board portions, angle irons for said toe board portion for reinforcing the device, said toe board being provided with openings for the reception of the pedals and steering wheel post, said dash having an opening therethrough whereby the device may be placed nearer the engine.

6. In a dash and toe board device, a dash, means thereon for securing and supporting the hood of an automobile, said means serving as a strengthening member for said dash, a toe board, and means for detachably securing said device to the automobile.

HARRY G. MOORE.

Witness:
W. H. REDFIELD.

Copies of this patent may be obtained for five cents each, by addressing the "Commissioner of Patents, Washington, D. C."